June 29, 1948. A. L. SILVERSTEIN 2,444,172
OPHTHALMOSCOPE WITH LIGHT DEVIATING MEANS
Filed Oct. 29, 1945
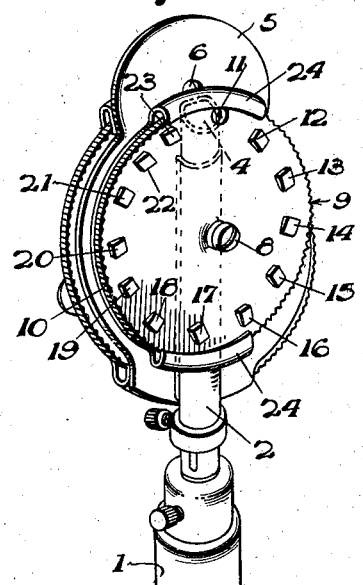
Fig. 1.
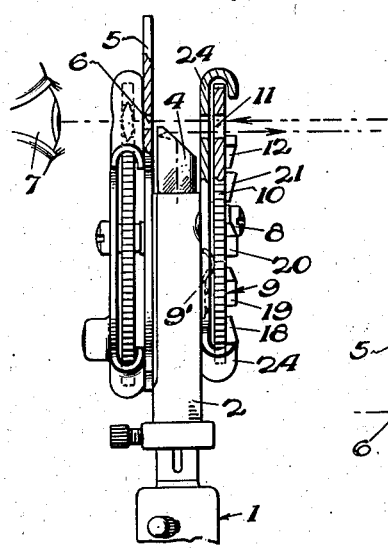
Fig. 2.
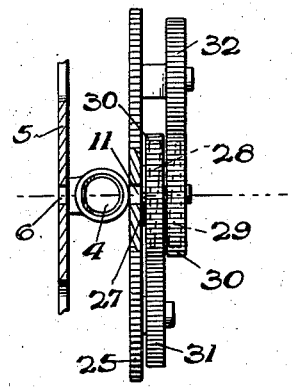
Fig. 5.
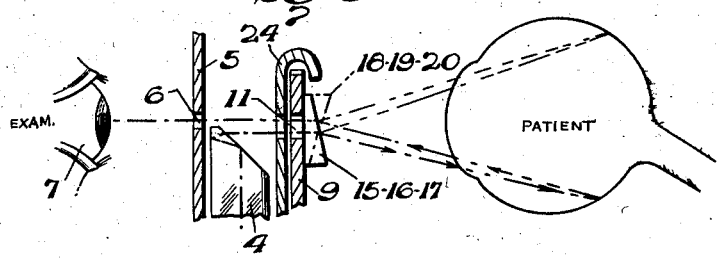
Fig. 3. Fig. 4.
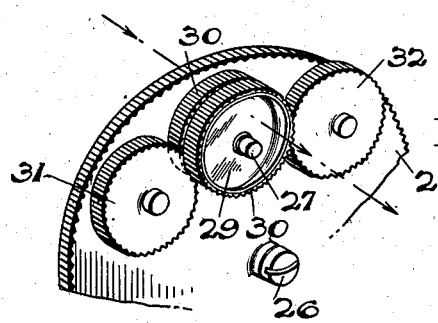
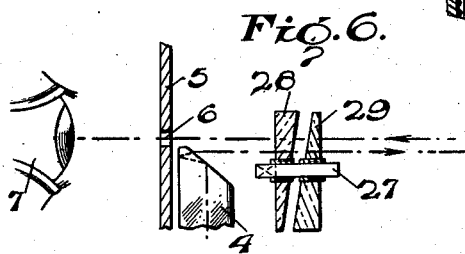
Fig. 6.
Inventor
Arnold L. Silverstein.
By
Attorney Patented June 29, 1948

2,444,172

UNITED STATES PATENT OFFICE 2,444,172

OPHTHALMOSCOPE WITH LIGHT DEVIATING MEANS

Arnold L. Silverstein, New York, N. Y.

Application October 29, 1945, Serial No. 625,153

4 Claims. (Cl. 88—22)

This invention is directed to an improvement in ophthalmoscopes, through which the examination capacity of the instrument is materially increased and the field of vision of the examiner permitted to cover substantially the entire fundus of the eye.

In the use of the conventional ophthalmoscope, considerable skill is required on the part of the examiner in so manipulating and aiming the instrument as to permit the examination of the more inaccessible picture of the fundus of the eye.

As the primary function of the ophthalmoscope is an examination of the fundus of the eye, and as, obviously, the examination of all areas of the fundus of the eye is vital, it is important that the instrument be designed to permit examination of the full area without the interference incident to the single direction of the conventional instrument, as well as to permit examination of eyes having abnormally small pupils or other physical peculiarities.

The primary object of the present invention is, therefore, the provision of means to be applied to a conventional ophthalmoscope, or built as an integral part of a new instrument, whereby the straight unidirectional light beam may be selectively deflected to center the beam on any and all parts of the fundus of the eye for complete examination.

More specifically, the invention comprises a disk to be permanently or removably secured to the conventional ophthalmoscope and selectively rotated with respect to the instrument, with an annular series of prisms carried by the disk and, under the rotation of the disk, selectively positioned in the light path from the instrument, the prisms being individually formed to deflect the light beams in different directions and to different degrees, to thereby permit the examiner to place the light beam on any particular spot or spots of the fundus of the eye.

A further specific feature of the improvement is the arrangement of the series of prisms in successive groups, each group deflecting the light beam in the same direction but successively at different deflections, the general deflection of any group differing from that of any other group, for instance, one group will deflect the light beam in different degrees to the right; the next group deflecting the light beam downwardly; the next group deflecting the light beam to the left; and the next group deflecting the light beam upwardly.

The invention also contemplates the provision of a single pair of prisms which may be selectively operated into superimposed positions of varying registry to deflect the light beam as desired.

The invention is illustrated in the accompanying drawings in which:

Figure 1 is a view in perspective showing the application of the improvement to a selected type of ophthalmoscope;

Figure 2 is a fragmentary side view in elevation, parts being broken away to illustrate the sighting apertures;

Figure 3 is a diagrammatic view of the device with the deflecting prisms in operative position;

Figure 4 is a fragmentary view in perspective of a modified form of the invention;

Figure 5 is a top plan view of the modified form, parts broken away to show the sighting apertures; and Figure 6 is a diagrammatic view of the modified device with the deflecting prisms in neutral position.

The instrument, referring to Figures 1 to 3, is shown generally at 1 and, for the purposes of the present invention, may include a light, tube 2 from which a source of light having its battery energy in the handle 3, is projected through a lens or prism 4 to direct the light along an axis at right angles to the main plate 5 which is mounted on the light tube 2 and in which is arranged a sight aperture 6 through which the observer views the eye of the patient as it is illuminated by the light beam. It is to be noted that the prism 4 bends the light rays so that the beam visible through the sight aperture 6 is directly at right angles to the plate 5.

In the use of the instrument it is practically necessary in every instance to make a thorough search of the fundus of the eye and this, even permitting manipulation of the instrument, is difficult to obtain by the direct beam from the conventional instrument.

The present invention therefore involves the use of a plurality of prisms positioned to intercept the light beam from the prism 4 and the sight beam from the aperture 6 to deflect said beams from their axes in different directions and to different angles in each of such directions. For this purpose a disk 7 is secured to the tube 2 in front of the prism 4. Rotatably supported at 8 on the disk 7 is a prism disk 9, the margin of which is roughened or serrated at 10 to enable the disk to be easily turned, and any conventional means 9' are provided for temporarily holding the disk 9 against casual rotation from any position in which it may be arranged. Formed in the disk 9 is an opening 11 which may be aligned with the prism 4 and sight aperture 6 by appropriate rotation of the disk 9 to enable the direct rays of the conventional instrument to be used.

Mounted in the disk 9 in an annular series are arranged a series of prisms any one of which, by appropriate manipulation of the disk 9, may be turned in line with and control the direction of the light beam of the conventional instrument visible through the sight aperture 6. The prisms on the prism disk 9 are preferably arranged in groups of three, one group including prisms 12, 13 and 14, the second group including prisms 15, 16, and 17, the third group including prisms 18, 19, and 20, and the fourth group including prisms 21, 22 and 23.

The group of prisms 12, 13 and 14, will bend the light ray to the right, and relatively to a different extent in each prism. The prisms 15, 16 and 17 will bend the light ray downwardly and to a different extent. The prisms 18, 19 and 20 will bend the ray upwardly and to a different extent and the prisms 21, 22 and 23 will bend the rays to the left and each to a different extent.

It will thus be obvious that the observer may by proper manipulation of the prism disk 9 in a simple easy turning movement secure the bending of the light ray in practically any direction and to any select angle in that direction. It will, of course, be understood that while three prisms are shown in each group, any desired or appropriate number of prisms may be used and the prisms of any one group may vary in prismatic power to any desired extent from the other prisms of that group.

If desired, and as preferred, the supporting disk 7 may be formed with lips 24 which overlie the edge of the prism disk 9 leaving the remainder of the prism disk exposed for manipulation without preventing its separation from the disk 7.

Figures 4 to 6 show a modified form of the invention in which a disk 25, supplanting the disk 7 of the preferred form, is secured to the post or standard 2 by means 26 which removably fixes the disk in position and against relative movement. Pivotally mounted on a pin 27 are similar prisms 28 and 29, the prisms being arranged in superimposed relation on an axis at right angles to the disk 25. The prisms are so mounted that they may be independently adjusted and, obviously, the direction of light ray deflection and the extent of such deflection is determined by the relation of the deflecting area of the prisms with respect to each other. Thus, if two prisms of equal strength be placed with the base of one over the apex of the other, they neutralize each other and if they are rotated in opposite directions the effect of the prismatic degree is gradually increased to their combined value.

Means are provided for independently rotating the prisms 28 and 29, such for example, and merely as illustrative of one form of such means, each prism is provided with a roughened or toothed edge frame 30 and cooperating gears 31 for the innermost prism and 32 for the outermost prism and rotatably mounted upon the disk 25, hereinafter termed a prism disk, so that either disk or both together may be moved in order to secure the desired bending or deflection of the conventional light ray of the instrument. Of course, the marginal edge of the prisms inwardly of their operating edge is arranged to receive the light ray from the prism 4 and visible through the peep-hole or sight opening 6.

It will be apparent that other arrangements of independent prism effects may be readily and conveniently applied to the conventional instrument and that the mounting of the supporting disk 7 of the preferred form and of the prism disk 25 of the modified form is intended to indicate any conventional mechanical means by which these parts may be secured to an appropriate part of the conventional instrument and in order to accommodate the particular parts or relation of that instrument, it being known and understood that this conventional instrument is on the market and in use in several different forms.

With the use of the improved attachment, which obviously may be removed from the instrument when not desired, provides for the operator a means by which he may direct the light ray necessary to his investigation in any direction and to any extent in that direction in the eye of the patient. No attempt is here made and no limitation is intended as to any particular prism formation or construction or as to any material size or relation, other than as defined, of the various disks.

What I claim as new is:

1. An ophthalmoscope comprising, in combination, a hollow handle member containing a light source, optical means supported by said member for directing a beam of light from said source along a given axis into the eye of a patient to illuminate a portion of the eye, a part supported by said member and having a sight aperture positioned adjacent said optical means and adapted for sighting the illuminated portion of the eye along a beam substantially coincident with said predetermined axis, a support mounted on said member in front of said optical means, and a plurality of prisms carried by said support to intercept and deflect said beams, said prisms being selectively adjustable to deflect said beams at different angles from said predetermined axis to thereby illuminate different portions of the patient's eye.

2. An ophthalmoscope comprising in combination, a hollow handle member containing a light source, optical means supported by said member for directing a beam of light from said source along a predetermined axis into the eye of a patient to illuminate a portion of the eye, a part mounted on said member and having a sight aperture positioned adjacent said optical means and adapted for sighting the illuminated portion of the eye along a beam substantially coincident with said predetermined axis, a disc rotatably supported by said member in front of said optical means, and a plurality of prisms carried by said disc circumferentially about its axis to intercept and deflect said beams, said prisms having different angles of deflection to deflect said beams at different angles from said predetermined axis to thereby illuminate different portions of the patient's eye.

3. An ophthalmoscope comprising, in combination, a hollow handle member containing a light source, optical means supported by member for directing a beam of light from said source along a predetermined axis into the eye of a patient to illuminate a portion of the eye, a part mounted on said member and having a sight aperture positioned adjacent said optical means and adapted for sighting the illuminated portion of the eye along a beam substantially coincident with said predetermined axis, a disc rotatably supported by said member in front of said optical means, and a plurality of prisms carried by said disc circumferentially about its axis to intercept and deflect said beams, said prisms having different angles of deflection to deflect said beams at different angles from said predetermined axis to thereby illuminate different portions of the patient's eye, said prisms being arranged in four groups, one group deflecting the beams upwardly; a second group deflecting the beams to the right, a third group deflecting the beams downwardly, and a fourth group deflecting the beams to the left.

4. An ophthalmoscope comprising in combination, a hollow handle member containing a light source, optical means supported by member for directing a beam of light from said source along a predetermined axis into the eye of a patient to illuminate a portion of the eye, a part mounted on said member and having a sight aperture positioned adjacent said optical means and adapted for sighting the illuminated portion of the eye along a beam substantially coincident with said predetermined axis, a disc rotatably supported by said member in front of said optical means, and a plurality of prisms carried by said disc circumferentially about its axis to intercept and deflect said beams, said prisms having different angles of deflection to deflect said beams at different angles from said predetermined axis to thereby illuminate different portions of the patient's eye, said prisms being arranged in four groups, one group deflecting the beams upwardly; a second group deflecting the beams to the right; a third group deflecting the beams downwardly; and a fourth group deflecting the beams to the left, the prisms of each group varying relatively in deflecting degree.

ARNOLD L. SILVERSTEIN.

REFERENCES CITED

The following references are of record in the file of this patent:

UNITED STATES PATENTS

| Number | Name | Date |
| --- | --- | --- |
| 738,887 | DeZeng | Sept. 15, 1903 |
| 987,951 | Brown | Mar. 28, 1911 |
| 989,244 | Goldson | Apr. 11, 1911 |
| 1,529,225 | Strang | Mar. 10, 1925 |
| 1,570,623 | DeZeng | Jan. 26, 1926 |
| 1,579,990 | Wilson | Apr. 6, 1926 |
| 1,611,167 | DeZeng | Dec. 21, 1926 |
| 1,680,534 | Garbutt et al. | Aug. 14, 1928 |
| 1,738,986 | Clement | Dec. 10, 1929 |
| 2,229,410 | Gulden | Jan. 21, 1941 |

FOREIGN PATENTS

| Number | Country | Date |
| --- | --- | --- |
| 20,389 | Great Britain | Mar. 3, 1911 |